Feb. 23, 1965 D. M. HUMPHREYS 3,171,130

MAGNETIC RECORDING

Filed Nov. 20, 1961

INVENTOR.
DONALD M. HUMPHREYS
BY
Bower & Patalidis
ATTORNEYS 3,171,130

MAGNETIC RECORDING

Donald M. Humphreys, Livonia, Mich., assignor to Ex-Cell-O Corporation, Detroit, Mich., a corporation of Michigan Filed Nov. 20, 1961, Ser. No. 153,361
14 Claims. (Cl. 346—74)

The invention relates in general to magnetic recording of information data by waves and more particularly to recording by demagnetizing portions of a fully magnetized magnetic medium by means of ultrasonic waves.

It is well known that certain crystalline substances, such as so-called Rochelle salt, quartz, tourmaline, potassium hydrophosphate, lithium potassium tartrate, ethylene diamine tartrate, to cite only a few, are apt to vibrate and to communicate vibrations to the ambient when an electromotive force is applied to the crystals.

The invention contemplates using crystalline substance that is caused to vibrate by applying to it a signal in the form of an electromotive force. The crystalline substance emits vibrations which are concentrated at one focal point where they are caused to demagnetize a spot by mechanical shock upon a pre-magnetized recording surface displaced through the focal point. Non-audible vibrations in the frequency spectrum commonly referred to as the ultrasonic spectrum are particularly capable of efficiently effecting the demagnetization of the surface by mechanical shock, and the invention is consequently of prime importance in relation to recording of "bits" of information such as are employed in dynamic magnetic data storage devices of the tape, drum, disc, and the like, types.

Magnetic recording of data upon a magnetizable surface medium has hitherto been generally effected by means of electromagnetic transducers either in contact with the record surface, which is detrimental to both the transducer and the record surface, or out of contact from the record surface. In the latter event, the strength of the signal recorded is decreased in function of the distance separating the transducer from the record surface and means must be provided for accurately and constantly positioning the transducer in relation to the record surface and for preventing any inaccuracies in the spacing by high precision in the manufacturing of the apparatus or by providing so-called flying transducer heads adapted to be supported by the natural laminar film of fluid set in motion by the rapidly moving record surface or by creating an artificial bearing by blowing fluid upon the surface of the record medium.

The invention provides a means of recording information by a transducer out of contact from the record surface and the information can subsequently be read by an electromagnetic transducer in the manner well known to those skilled in the art.

One object of the invention is therefore to provide a method and means for recording information on a premagnetized medium by demagnetizing portions of the magnetized surface by mechanical shock.

Another object of the invention is to provide a transducer for effecting recording of information by the method and means herein described.

A further object of the invention is to provide a transducer which comprises a crystalline substance emitting waves by vibrations caused by electromotive force.

Still another object of the invention is to provide means for focusing and concentrating a wave beam to a focal point for the purpose indicated.

Still a further object of the invention is to provide a transducer which effectuates the purpose indicated while being out of contact from the record medium without any need for auxiliary support means such as a fluid bearing shoe.

Other objects and advantages will become apparent from the following description taken in connection with the accompanying drawings, wherein.

Figure 1:
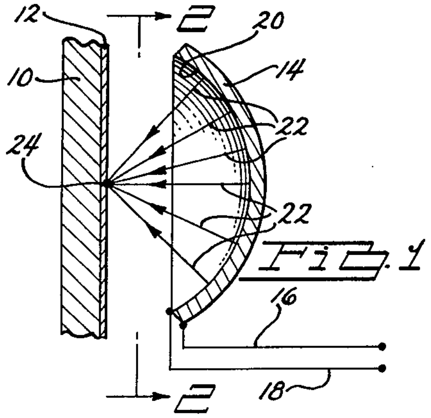
FIGURE 1 is a schematic cross sectional view of an apparatus constructed according to the teaching of the invention.
Figure 2:
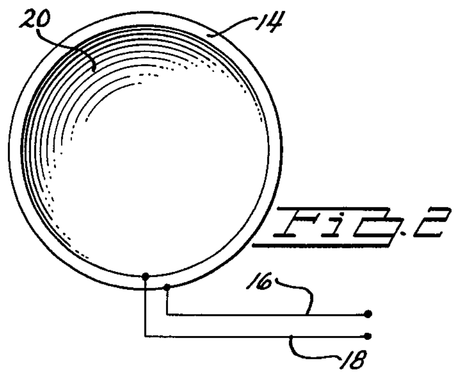
FIGURE 2 is a front elevation view of the apparatus of FIGURE 1 as seen from line 2—2 of FIGURE 1 looking in the direction of the arrows.

As seen in FIGURES 1 and 2, the invention comprises a combination of a record medium 10, having a magnetized record surface 12 thereon, and a transducer 14. The transducer 14, which is made of any crystalline substance susceptible of vibrating and therefore emitting waves under the influence of an electromotive force applied by means of the electrical conductors 16 and 18, according to the well-known converse of the piezoelectric principles, is disposed proximate the record surface. The transducer preferably presents a concave spherical surface 20 aimed at the recording surface, and the waves emitted by the spherical surface, the materialized paths of such waves being arbitrarily shown as arrowed lines 22, converge to a focal point 24 which coincides with the center of the sphere of the surface 20. The transducer 14 is positioned in such a way away from the recording surface 12 that the waves converging at the focal point 24 strike the recording surface at their locus of convergence thus supplying a mechanical shock of maximum intensity for demagnetizing a precise and narrow spot on the recording surface.

The record medium 10 is moved in front of the transducer at a predetermined velocity in order to insure timing of the recording, and thus portions of the surface 12 are left magnetized or are caused to be demagnetized according to whether the transducer is inoperative or is caused to become emissive.

Figure 3:
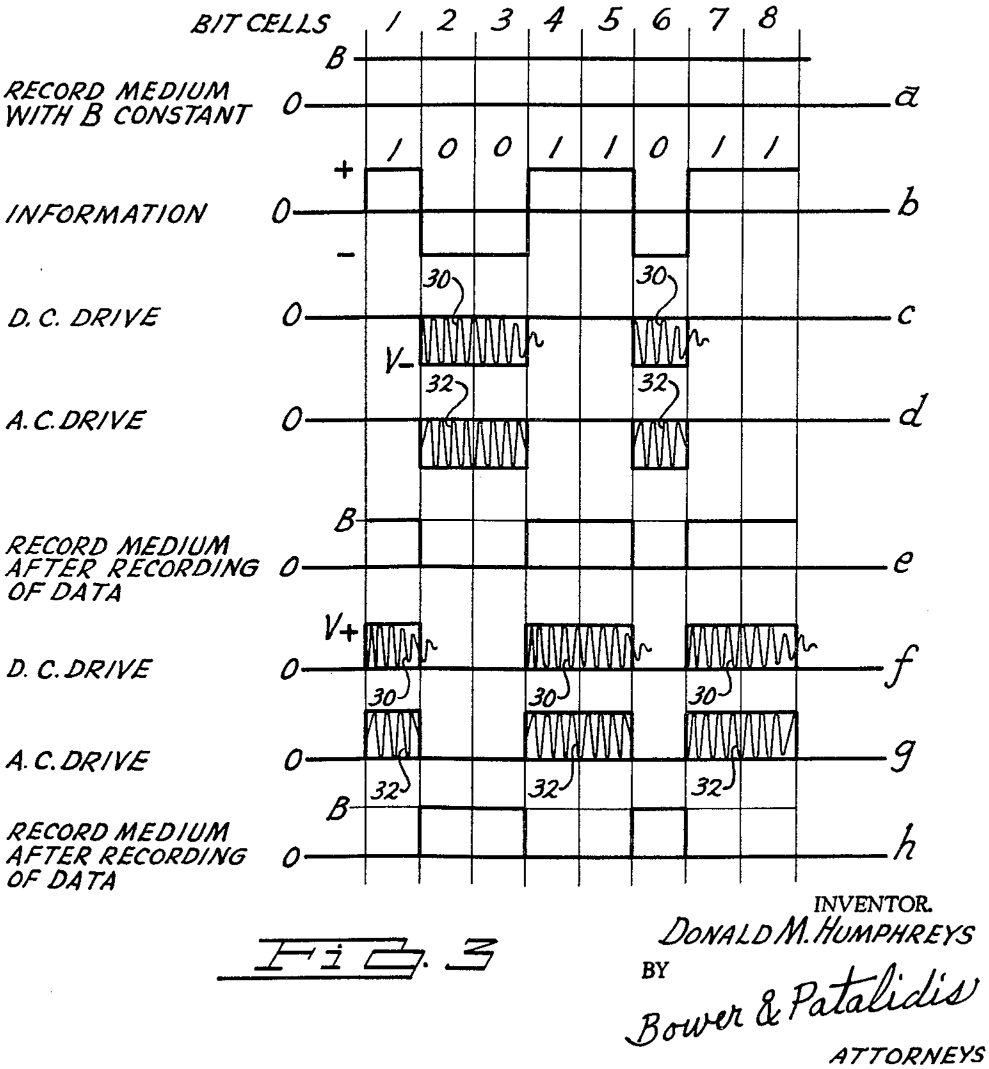
FIGURE 3 is a diagrammatical graphical representation of wave forms plotted to a common time scale, helpful in understanding the basic principle of the invention.

Referring now to FIGURE 3, timed bit cells on the path of the focal point 24 are arbitrarily identified by numerals 1 to 8 for the sake of explanation. FIGURE 3(*a*) represents the constant magnetization level B of the recording surface before recording of information.

FIGURE 3(*b*) illustrates a graphic representation of binary number 10011011 (number 155 in decimal notation) which could be recorded in the usual "return to zero" mode of recording by recording a "1" in bit cell 1, a "0" in bit cells 2 and 3, a "1" in bit cells 4 and 5, a "0" in bit cell 6 and a "1" in bit cells 7 and 8, the "1" being represented by a positive pulse and the "0" by a negative pulse. Other well-known modes of recording such as "return to bias," "non-return to zero," phase modulation, etc., could be represented in a similar graphic representation and it will be apparent to those skilled in the art that the principle of recording of the invention remains the same, irrespective of the recording scheme actually adopted.

FIGURE 3(*c*) shows how the negative pulse is applied to the transducer to produce a direct current drive that causes the transducer to emit waves 30 of a frequency corresponding to the structure of the material of the transducer. As soon as the direct current drive is interrupted the vibration of the transducer stops after a few rapidly dampened oscillations.

FIGURE 3(*d*) shows how an alternating current electromotive force is applied to the transducer during the time that a "0" or a series of "0's" is sought to be recorded and FIGURE 3(*e*) shows the level of magnetization B of the bit cells after the magnetization of cells 2, 3 and 6 has been destroyed by the mechanical shock induced by the waves emitted by the transducer striking the record surface during its precisely timed passage through the focal point of the transducer.

FIGURE 3 (*f* and *g*) shows how the positive pulses of the information represented by FIGURE 3(*b*) could be used to drive the transducer either by applying to it a direct current or an alternating current electromative force. The resultant recorded data is represented by FIGURE 3(*h*) and appears as the inverse, or negative image, of the information recorded. This, however, is of no importance as the choice of the modes of recording is evidently arbitrary and the circuits of the read transducer can be adapted to inverse the reading, or alternately "1's" may arbitrarily be represented by a state of non-magnetization of the record surface as long as "0's" are represented by a state of magnetization.

It will be apparent to those skilled in the art that the graphic representations of the invention and its principle is for illustrative purpose only, and that many embodiments and additions are within the scope and spirit of the invention as defined in the appended claims.

What is new is:

1. In combination: a record medium having a magnetizable surface thereon which has been premagnetized to a predetermined level; a piezoelectric crystal capable of vibrating during the period of time that an electromotive force is applied to said crystal, whereby a wave beam is produced by said crystal, said wave beam being transmitted through the ambient; means for causing said wave beam to converge to a spot upon said surface; whereby, when said record medium is translated in relation to said crystal, portions of said surface are selectively demagnetized by the mechanical shock induced by said wave beam impinging upon said surface.

2. The apparatus of claim 1 wherein the wave beam is an ultrasonic wave beam.

3. The apparatus of claim 1 wherein the electromotive force applied to said crystal is a direct current voltage.

4. The apparatus of claim 1 wherein the electromotive force applied to said crystal is an alternating current voltage.

5. In combination: a piezoelectric crystal capable of vibrating during the period of time that an electromotive force is applied to said crystal, whereby a wave beam is produced by said crystal, said wave beam being transmitted through the ambient; said crystal having a wave beam emitting face concavely curved in the shape of a segment of a sphere causing said wave beam to converge to a focal point coincident with the center of the sphere; and a record medium having a magnetic surface thereon which has been premagnetized to a predetermined level, said record medium being translated in relation to said crystal at a distance therefrom such that said wave beam impinges upon the magnetic surface at said focal point; whereby some portions of said surface are selectively demagnetized by the mechanical shock induced by said wave beam, and the remaining of said surface is left substantially undisturbed.

6. The apparatus of claim 5 wherein the wave beam is an ultrasonic wave beam.

7. The apparatus of claim 5 wherein the electromotive force applied to said crystal is a direct current voltage.

8. The apparatus of claim 5 wherein the electromotive force applied to said crystal is an alternating current voltage.

9. Magnetic recording comprising: means emitting a wave beam in response to a command signal; and means focusing said wave beam to a spot on a movable premagnetized record surface, whereby portions of said surface are selectively demagnetized by mechanical shock induced by said wave beam.

10. Magnetic recording according to claim 7 wherein the command signal is an electrical pulse of timed duration.

11. In combination with a premagnetized recording surface, a wave beam emitting transducer adapted to concentrate and focus said wave beam to a point on said recording surface for causing demagnetization of said recording surface at said point.

12. A method of recording information by selective demagnetization of a premagnetized record surface, said selective demagnetization being effected by wave induced mechanical shock.

13. The method of claim 12 wherein the mechanical shock is induced by ultrasonic waves.

14. A method of recording information upon a premagnetized record surface by causing a beam of ultrasonic wave to selectively demagnetize portion of said record surface by mechanical shock, whereby the recorded information consists of a succession of magnetized and non-magnetized spots upon said record surface.

References Cited in the file of this patent

Athinson, E.: Carnot's Physics, N.Y., William Wood & Co., 1886. QC21.G3tE. Page 641 relied on.

Brailsford, F.: Magnetic Materials, N.Y., John Wiley and Sons Inc., 1962. QC753.B78. Pages 143–146 relied on.